United States Patent
Semura et al.

(10) Patent No.: US 9,112,438 B2
(45) Date of Patent: Aug. 18, 2015

(54) CONTROL APPARATUS REDUCING NOISE COMING FROM ROTARY ELECTRIC MACHINE

(71) Applicant: DENSO CORPORATION, Kariya, Aichi-pref. (JP)

(72) Inventors: Junichi Semura, Kariya (JP); Tomohiro Sudoh, Okazaki (JP); Masanori Morikawa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 89 days.

(21) Appl. No.: 13/868,430

(22) Filed: Apr. 23, 2013

(65) Prior Publication Data

US 2013/0278192 A1    Oct. 24, 2013

(30) Foreign Application Priority Data

Apr. 23, 2012   (JP) .................................. 2012-097446

(51) Int. Cl.
*H02P 1/46* (2006.01)
*H02P 6/10* (2006.01)
*H02P 6/14* (2006.01)

(52) U.S. Cl.
CPC . *H02P 6/10* (2013.01); *H02P 6/142* (2013.01)

(58) Field of Classification Search
USPC .................................. 318/254, 721, 798–810
See application file for complete search history.

(56) References Cited

U.S. PATENT DOCUMENTS

| | | | |
|---|---|---|---|
| 6,404,152 B1 * | 6/2002 | Kobayashi et al. | 318/400.23 |
| 2005/0033547 A1* | 2/2005 | Morishita | 702/147 |
| 2006/0067093 A1* | 3/2006 | Tanaka et al. | 363/41 |
| 2012/0181960 A1* | 7/2012 | Kameyama | 318/400.13 |

FOREIGN PATENT DOCUMENTS

| | | | |
|---|---|---|---|
| JP | A-11-341864 | | 12/1999 |
| JP | 2003018878 A | * | 1/2003 |
| JP | B2-4574898 | | 11/2010 |

OTHER PUBLICATIONS

Japanese Office Action issued in Japanese Patent Application No. 2012-097446 on Mar. 18, 2014 (with translation).

* cited by examiner

*Primary Examiner* — Rina Duda
*Assistant Examiner* — Bickey Dhakal
(74) *Attorney, Agent, or Firm* — Oliff PLC

(57) ABSTRACT

A control apparatus for a rotary electric machine includes: operating unit for operating a DC-AC conversion circuit including a switching element so as to control a controlled variable of the rotary electric machine, the switching element selectively connects positive and negative terminals of a DC power source to respective terminals of the rotary electric machine and conduction period setting unit, in response to a rotational speed of the rotary electric machine, for setting a conduction period during which the respective terminals of the rotary electric machine, and the positive and negative terminals of the DC power source are allowed to be electrically connected therebetween via the switching element. The conduction period setting unit set the conduction period as a manipulated variable so as to reduce electromagnetic force distortion at a frequency corresponding to a resonant frequency of the rotary electric machine.

6 Claims, 4 Drawing Sheets

FIG.2
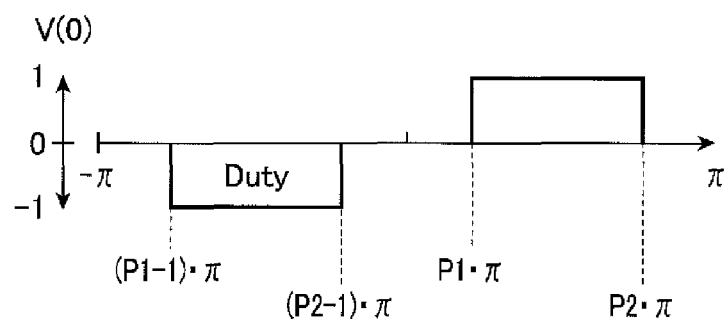
FIG.3A
2ND DEGREE CIRCULAR MODE
FIG.3B
3RD DEGREE CIRCULAR MODE
FIG.3C
4TH DEGREE CIRCULAR MODE
FIG.3D
0TH DEGREE CIRCULAR MODE
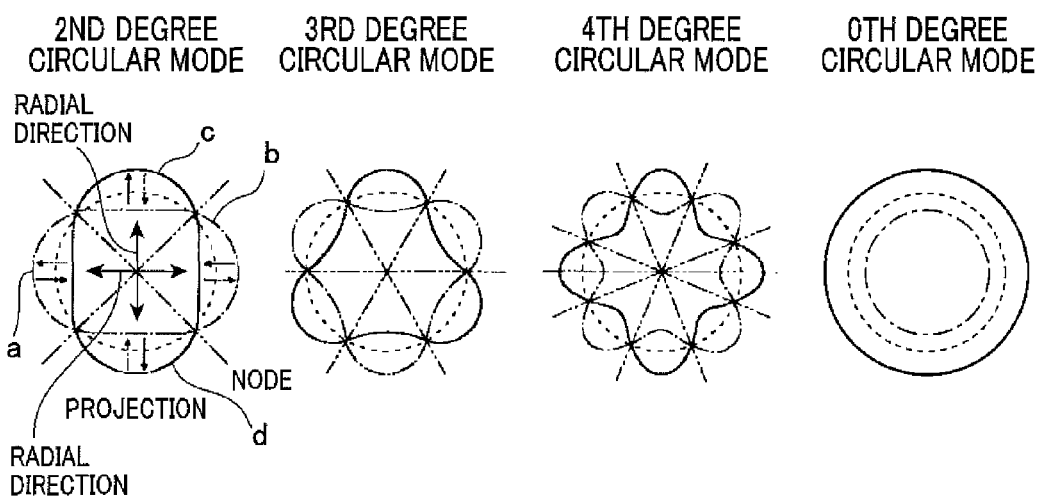

CONCENTRATED WINDING
ELECTROMAGNETIC FORCE DISTRIBUTION (CIRCULAR MODE DEGREE)

|  |  | NUMBER OF SLOTS | | | | | |
|---|---|---|---|---|---|---|---|
|  |  | 3s | 6s | 9s | 12s | 15s | 18s | 21s |
| NUMBER OF POLES | 2p | – | – | – | – | – | – | – |
|  | 4p | – | 2ND | 4TH | 4TH | 4TH | 4TH | 4TH |
|  | 6p | – | – | 3RD | – | 6TH | – | 6TH |
|  | 8p | – | 2ND | – | 4TH | 7TH | 8TH | 8TH |
|  | 10p | – | 2ND | – | 2ND | 5TH | 8TH | 10TH |
|  | 12p | – | – | 3RD | – | 3RD | 6TH | 9TH |
|  | 14p | – | 2ND | 4TH | 2ND | – | 4TH | 7TH |
|  | 16p | – | 2ND | 2ND | 4TH | – | 2ND | 5TH |

FIG.6
| $\omega*$ | LOW ← → HIGH |
|---|---|
| Won | LONG ← → SHORT |
| $\omega*$ | LOW ← → HIGH |
|---|---|
| Db | SMALL ← → LARGE |
FIG.7A
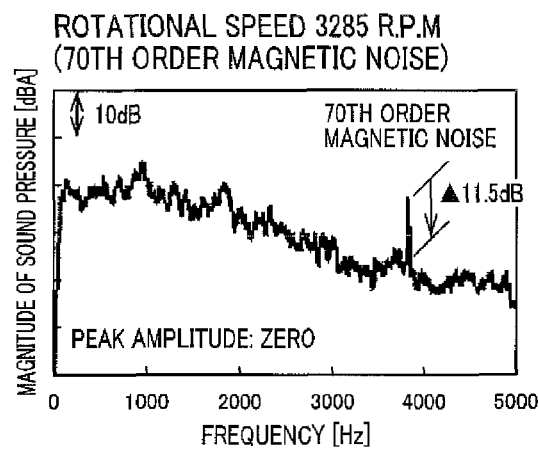
FIG.7B
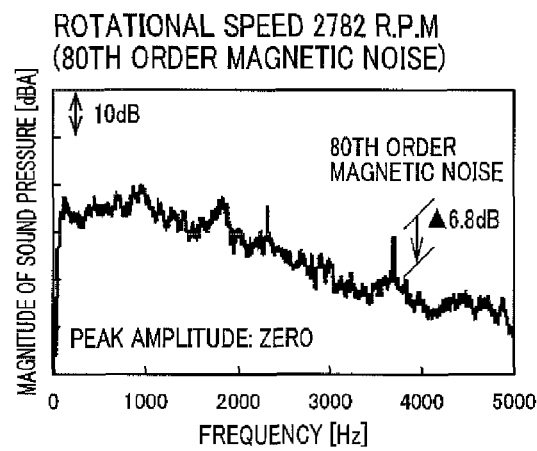
FIG.8
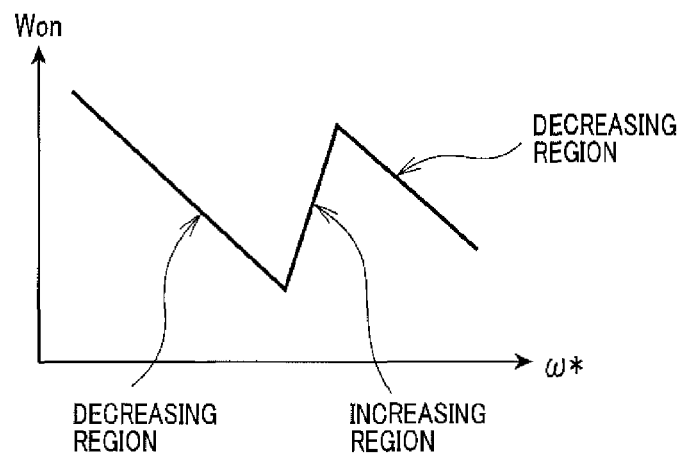

US 9,112,438 B2

CONTROL APPARATUS REDUCING NOISE COMING FROM ROTARY ELECTRIC MACHINE

CROSS REFERENCE TO RELATED APPLICATION

This application is based on and claims the benefit of priority from earlier Japanese Patent Application No. 2012-97446 filed on Apr. 23, 2012 the description of which is incorporated herein by reference.

BACKGROUND

1. Technical Field

The present disclosure relates generally to a control apparatus for a rotary electric machine. More particularly, the present disclosure relates to a control apparatus that controls the rotary electric machine provided with a DC-AC conversion circuit including switching elements.

2. Description of the Related Art

The control apparatus controls the DC-AC conversion circuit so as to control the controlled variable of the rotary electric machine such that the switching element included in the DC-AC conversion circuit is controlled so as to selectively connect the positive and negative terminals of the DC power source to the respective terminals of the rotary electric machine.

In this type of control apparatus, for example, a Japanese Patent No. 4574898 discloses a control apparatus in which a conduction phase of the rotary electric machine is advanced and the conduction period is extended when a frequency of an electromagnetic-force distortion due to current distortion flowing through the rotary electric machine is identical to the resonant frequency of the rotary electric machine. This control is for reducing noise caused by the resonant frequency being identical to the frequency of the electromagnetic-force distortion.

However, according to the above-described control apparatus, as a manipulative variable, both conduction phase and conduction period are controlled in order to reduce the above-described noise. In this case, the controlling the rotary electric machine becomes complicated.

SUMMARY

The embodiment provides a newly developed control apparatus for a rotary electric machine in which an electromagnetic-force distortion produced at a resonant frequency of the rotary electric machine can be further reduced.

As a first aspect of the present disclosure, a control apparatus that controls a rotary electric machine is provided.

The control apparatus includes: operating means for operating a DC-AC conversion circuit including a switching element so as to control a controlled variable of the rotary electric machine, the switching element selectively connecting a positive terminal and a negative terminal of a DC power source to respective terminals of the rotary electric machine (10); and conduction period setting means included in the operating means for setting, in response to a rotational speed of the rotary electric machine, a conduction period during which the respective terminals of the rotary electric machine and the positive terminal and the negative terminal of the DC power source are allowed to be electrically connected therebetween via the switching element. The conduction period setting means is configured to set the conduction period as a manipulative variable so as to reduce electromagnetic-force distortion of which frequency component corresponds to a resonant frequency of the rotary electric machine.

Since the inventors have found that the magnitude of the voltage of higher harmonics can be made substantially zero by controlling the conduction period, according to the present disclosure, the electromagnetic distortion is reduced by using the conduction period as a manipulated valuable in the feedback control.

BRIEF DESCRIPTION OF THE DRAWINGS

FIG. 2 is an explanatory diagram showing a principle of the first embodiment;

FIGS. 3A, 3B, 3C and 3D are diagrams showing various circular modes;

FIG. 6 is a diagram showing a relationship between the conduction period and the time ratio value;

FIGS. 7A and 7B are graphs showing advantages according to the first embodiment; and FIG. 8 is a diagram showing the conduction period according to the second embodiment.

DETAILED DESCRIPTION OF THE PREFERRED EMBODIMENTS

First Embodiment

With reference to the drawings, a configuration of the first embodiment in which a control apparatus for the rotary electric machine is adapted to a motor mounted on the blower fan in the on-board air conditioner.

Figure 1:
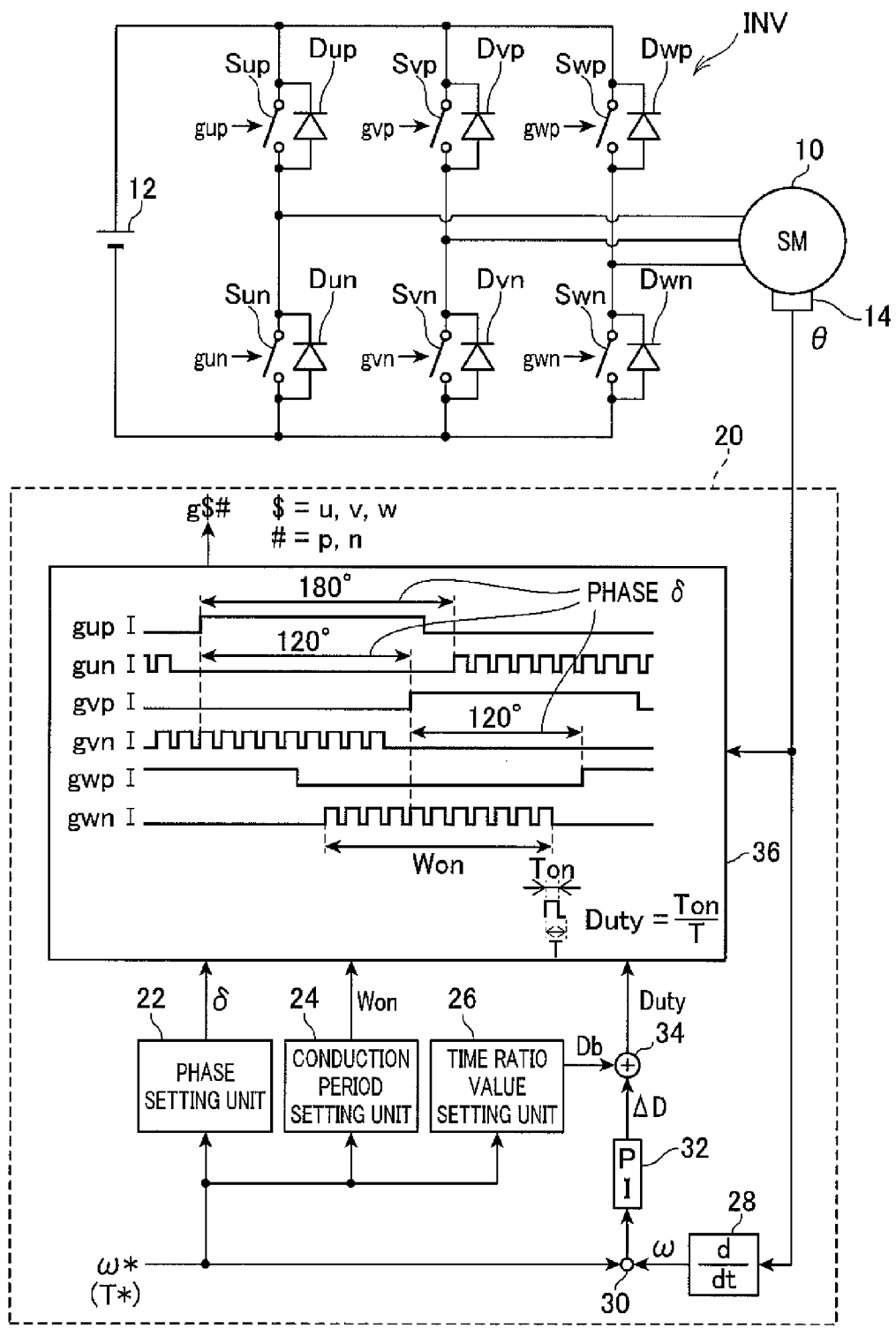
FIG. 1 is a block diagram showing an overall configuration according to the first embodiment of the present disclosure.

The motor 10 as shown in FIG. 1 is a three-phase synchronous motor which is mounted on the blower of the on-board air conditioner. According to the first embodiment, the motor 10 includes concentrated windings having 10 poles and 12 slots. The motor 10 is electrically connected to the battery 12 (DC power source) via an inverter INV (DC-AC conversion circuit). The inverter INV includes three series-connected circuits each having a pair of switching elements S\$p, S\$n (\$=u, v, w). The connection points between respective switching elements S\$p and S\$n are electrically connected to respective phase windings of the motor 10, i.e., U-phase, V-phase and W-phase. The diodes D\$# are connected in parallel to the switching elements S\$# (\$=u, v, w; #=p, n) and connected to be in the reverse direction thereof.

Meanwhile, the control apparatus 20 (operating means) is configured to control the inverter INV thereby controlling the motor 10. The switching elements S\$p, S\$n included in the inverter INV are controlled so as to selectively connect the positive and negative terminals of the battery 12 to the respective terminals (phase windings) of the motor 10. According to the first embodiment, the control apparatus 10 controls the rotational speed ω as a controlled variable of the motor 10 to be a commanded value thereof, i.e., speed command value ω* whereby a feedback control of the motor 10 is performed. It is noted that the feedback manipulative variable is the output voltage of the inverter INV.

Specifically, in response to the speed command value ω*, the phase setting unit 22 variably sets the phase δ of the output voltage of the inverter INV. The phase δ is referred to as an open-loop manipulative variable of the rotational speed ω as a controlled variable. In response to the speed command value ω*, the conduction period setting unit 24 (conduction period setting means) variably sets a conduction period Won during which the switching elements S$# are allowed to be ON. The conduction period Won is also referred to a connection enabled period during which respective phase windings of the motor 10 are electrically connected to the battery 12 via the switching elements S$#. Further, in response to the speed command value ω*, the time ratio value setting unit 26 sets a time ratio value (duty base value Db) which is a ratio of ON time Ton to the period T of the lower arm switching elements S$n (i.e., duty) during the conduction period Won thereof. It is noted that the duty base value Db is an open-loop manipulative variable in order to control the magnitude of fundamental waves included in the output voltage of the inverter INV to be a predetermined value V1b.

Moreover, a rotational angle θ (mechanical angle) of the motor 10 is detected by a rotational angle sensor 14 and outputted to a speed calculation unit 28. The speed calculation unit 28 receives a rotational angle θ and calculates the rotational speed ω. The deviation calculation unit 30 subtracts the rotational speed ω from the speed command value ω* and outputs the subtracted value to a feedback control unit 32. The feedback control unit 32 receives the output value of the deviation calculation unit 30 and calculates a calibration value ΔD of the duty base value Db which is a feedback manipulated variable. In the above-described control, it is exemplified that the calibration value ΔD is produced from a sum of the proportional element and the integrating element in the output value of the deviation calculation unit 30. The calibration value ΔD calculated as described above is added to the duty base value Db by the calibration unit 34. The output value of the calibration unit 34 becomes the final duty value.

The phase δ set by the above-described phase setting unit 22, the conduction period Won set by the conduction period setting unit 24 and the final duty value outputted by the calibration unit 34 are transmitted to an operation signal generating unit 36. The operation signal generating unit 36 generates operation signals g$# corresponding to the switching elements S$# and outputs the generated operation signals g$# to the inverter INV.

The operation signals g$p remain ON control signals while the conduction periods Won are active (electrical angle). Meanwhile, the operation signal g$n periodically switches between being ON control signal and being OFF control signal while the conduction period are being active. Particularly, in the period of being ON control signal of the operation signals g$p and g$n, the operation signals g$p and g$n have opposite phases (i.e., 180 degrees) shifted from each other. Also, in the period of being ON control signal of the operation signals gup and the gyp, both phases are shifted 120 degrees from each other. The timing when the respective operation signals g$# becomes ON varies depending on the phase δ. According to the first embodiment, it is assumed that the conduction period Won is set to be from 120 degrees to 180 degrees.

Considering pulse wave control is performed like in the first embodiment, since voltages applied to the respective phases in the motor 10 are not fundamental waves, the current flowing through the motor 10 has a current distortion which is a difference from the fundamental waves. When a frequency component of electromagnetic-force distortion caused by the current distortion corresponds to an inherent resonant frequency of the motor 10, noise produced in the motor 10 becomes larger so that noise level in the human audible frequency range may become larger.

According to the first embodiment, the conduction period Won is used for a manipulative variable to reduce an electromagnetic-force distortion. In other words, the conduction period setting unit 24 is referred to a feed forward control used for reducing an electromagnetic-force distortion. Hereinafter is described the feed forward control means adapted to the first embodiment.

As shown in FIG. 2, regarding the output voltage (V (θ)) of the respective phases of the inverter INV, when a phase at which the switching element S$p turns ON in the ON-period of the switching element S$p is defined as P1·π and a phase at which the switching element S$p turns OFF in the ON-period of the switching element S$p is defined as P2·π, the phase at which the switching element S$n turns ON in the ON-period of the switching element S$n is represented as:

$(P1-1)\cdot \pi$ and the phase at which the switching element S$n turns OFF in the ON-period of the switching element S$n is represented as:

$(P2-1)\cdot \pi$

Here, when a Fourier expansion is applied to the voltage V (θ), the voltage V (θ) is represented as the following equation (c1).

$$V(\theta) = \frac{a0}{2} + \sum_{k=1}^{\infty} ak \cdot \cos(k\cdot\theta) + \sum_{k=1}^{\infty} bk \cdot \sin(k\cdot\theta) \tag{c1}$$

Where the coefficient ak is represented as the following equation (c2).

$$\begin{aligned}ak &= \frac{1}{\pi} \cdot \int_{-\pi}^{\pi} V(\theta)\cdot \cos(k\cdot\theta)\, d\theta \\ &= \frac{1}{\pi}\cdot \int_{(P1-1)\pi}^{(P2-1)\pi}(-\text{Duty})\cdot \cos(k\cdot\theta)\, d\theta + \frac{1}{\pi}\cdot \int_{P1\cdot\pi}^{P2\cdot\pi} 1\cdot \cos(k\cdot\theta)\, d\theta \\ &= \frac{1-\text{Duty}\cdot \cos(k\cdot\theta)}{\pi\cdot k}\cdot \{\sin(k\cdot P2\cdot\pi) - \sin(k\cdot P1\cdot\pi)\}\end{aligned} \tag{c2}$$

Moreover, the coefficient bk is represented as the following equation (c3).

$$\begin{aligned}bk &= \frac{1}{\pi} \cdot \int_{-\pi}^{\pi} V(\theta)\cdot \sin(k\cdot\theta)\, d\theta \\ &= \frac{1}{\pi}\cdot \int_{(P1-1)\pi}^{(P2-1)\pi}(-\text{Duty})\cdot \sin(k\cdot\theta)\, d\theta + \frac{1}{\pi}\cdot \int_{P1\cdot\pi}^{P2\cdot\pi} 1\cdot \sin(k\cdot\theta)\, d\theta \\ &= \frac{1-\text{Duty}\cdot \cos(k\cdot\theta)}{\pi\cdot k}\cdot \{\cos(k\cdot P2\cdot\pi) - \cos(k\cdot P1\cdot\pi)\}\end{aligned} \tag{c3}$$

Hence, the magnitude of k-th order harmonics in the voltage V (θ), i.e., Vk is represented as the following equation (c4):

$$\begin{aligned}Vk &= \sqrt{ak^2 + bk^2} \\ &= \frac{1-\text{Duty}\cdot \cos(k\cdot\pi)}{\pi\cdot k}\cdot \\ &\quad \sqrt{\{\sin(k\cdot P2\cdot\pi)-\sin(k\cdot P1\cdot\pi)\}^2 + \{\cos(k\cdot P2\cdot\pi)-\cos(k\cdot P1\cdot\pi)\}^2}\end{aligned} \tag{c4}$$

-continued $$= \frac{1 - \text{Duty} \cdot \cos(k \cdot \pi)}{\pi \cdot k} \cdot \sqrt{2 - 2 \cdot \cos(k \cdot (P2 - P1) \cdot \pi)}$$

$$= \frac{1 - \text{Duty} \cdot \cos(k \cdot \pi)}{\pi \cdot k} \cdot \sqrt{2 - 2 \cdot \cos(k \cdot \text{Won})}$$

According to the above-described equation c4, by setting the conduction period Won to satisfy the equation "k·Won=2π·N, where N is a natural number", magnitude of the k-th order harmonics in the voltage V (θ) can be zero, regardless of the duty value. Considering the electromagnetic-force distortion is produced from the voltage distortion, by reducing the higher harmonics in the voltage V (θ), the electromagnetic-force distortion can be reduced. Therefore, the equation (c4) gives information that the conduction period Won can be used as a single manipulative variable that reduces electromagnetic distortion.

Assuming higher harmonics of flux linkage can be neglected, the electromagnetic-force distortion includes an even number of harmonics. This is estimated based on the fact that the electromagnetic force is produced from multiplying the amount of current and flux linkage together, and fact that even number of harmonics of the voltage distortion which causes current distortion can be neglected. In other words, when an amount of flux linkage is proportional to function cos (θ) and magnitude of k-th harmonics voltage which causes k-th harmonics current is proportional to function sin (kθ), the electromagnetic-force distortion is represented based on an equation expressed as:

$\cos(\theta) \cdot \sin(k\theta) \propto \sin[(k+1) \cdot \theta] - \sin[(k-1) \cdot \theta]$, wherein the electromagnetic-force distortion becomes even number when the constant $k$ is odd number.

When the number of pair of poles is P, a frequency of even order (2·m)-th electromagnetic-force distortion is "2·P·m·(rotational speed)". Therefore, assuming the unit of rotational speed ω is revolutions per minutes, r.p.m. and reducing (2m±1)-th order higher harmonics (m is a variable in the following equation (c5)), the electromagnetic-force distortion can be reduced when the frequency of the electromagnetic-force distortion corresponds to the resonant frequency of the motor 10.

$2 \cdot P \cdot m \cdot \omega = (\text{resonant frequency}) \cdot 60$ \hfill (c5)

where the number of order (2·m) is a function of the rotational speed ω.

According to the first embodiment, specifically, the conduction period Won is set so as to reduce only (6±2)-th order harmonics of the electromagnetic-force distortion in the 2m-th order the electromagnetic-force distortion (m satisfies the above described equation (c5)). Hereinafter is described the reason why the specific order harmonics of the electromagnetic-force distortion is reduced.

FIGS. 3A, 3B, 3C and 3D illustrate the circular mode related to the motor as an elastic body. The circular mode is variations of periodical change in shape of the motor as an elastic body, caused by exciting force applied to the radial direction of the motor. In the second degree of circular mode as shown in FIG. 3A, two portions located apart from each other with π (180 degree), e.g., portions a and b, are extended outward in the radial direction from the original shape (a circle shape indicated with a dotted line in FIG. 3A) in which exciting force is not applied, and other two portions, e.g. portions c and d, located apart from the portions a and b with π/2 (90 degree) are contracted in the radial direction. The portion which is contracted, is referred to as a projection and a portions indicated with a long dashed double-short dashed line is referred to a node in which the shape thereof is not substantially changed from the original shape.

As shown in FIG. 3B, in the third degree of circular mode, three portions that simultaneously extend from the original shape exist. Similarly, as shown in FIG. 3C, in the fourth degree circular mode, four portions extend from the original shape. Regarding the 0-th degree of circular mode as shown in FIG. 3D, the original shape is maintained, however, the shape changes repeatedly in radial direction to be extended or contracted.

These respective circular modes have their own frequencies. When the frequency of the exciting force depending on the respective circular modes matches with the own frequencies, a resonance phenomenon occurs. Therefore, the resonant frequencies according to the first embodiment correspond to own frequencies inherent to the respective degree of the circular modes.

The exciting force depending on the respective circular modes is defined such that the number of regions including an increasing angle of a repulsive force in a mechanical angle region, which is generated during one mechanical angle (angle corresponding to one rotation) and the degree of the circular mode are identical. It is noted that the mechanical angle region is divided by an increasing angle of a suction force produced by current flowing to generate the rotational flux in the motor 10.

Specifically, the following two cases are defined. In the first case, exciting force corresponding to the 0-th degree of circular mode is defined such that the exciting force becomes either suction force or repulsive force produced within one mechanical angle due to the current flowing that generates the rotational flux in the motor 10. In the second case, exciting force corresponding to a circular mode having degree larger than 0-th is defined such that an amount of one mechanical angle is divided by an amount of angle corresponding to a period of the suction force (suction mode) and repulsive force (repulsive mode) produced within one mechanical angle, and this becomes a degree of the circular mode. In other words, for example, regarding the exciting force that produces the second degree of circular mode, as shown in FIG. 3A, since an interval of the angle between a portion where the suction force increases and a portion where the suction force decreases in the one mechanical angle becomes π/2, the mechanical angle region divided by a pair of portion where the suction force increases, becomes π. In the one mechanical angle, two mechanical angle regions are generated, which corresponds to the degree of the circular mode.

Practically, the circular mode in which resonant phenomenon may occur due to the above-described electromagnetic-force distortion may be limited to a circular mode having a degree larger than zero, which is determined by the 0-th degree of the circular mode and the structure of the motor 10. In particular, the 2m-th order electromagnetic-force distortion includes 6th order harmonics and (6n±2)-th order harmonics, the 6th order electromagnetic-force distortion corresponds to the 0-th degree of circular mode and the (6n±2)-th order electromagnetic-force distortion corresponds to unique number of degree of circular mode determined by the structure of the motor 10.

Specifically, the fundamental components of the respective phases of the electromagnetic force are shifted from each other by 120 deg of electrical angle in the motor 10. Therefore, phases of 6th order harmonics are identical in the respective phases of the motor 10 so that phases of the 6-th order electromagnetic-force distortion are identical in the respective phases of the motor 10. Hence, the electromagnetic-force distortion at any timing becomes either suction mode or repulsive mode in the entire region of one mechanical angle. As a result, a resonance phenomenon may occur with the 0-th degree circular mode Regarding the (6n±2)-th order electromagnetic-force distortion, the phases of electromagnetic-force distortion in the respective phases of the motor 10 are shifted from each other with 120 degree of the electrical angle. The phase shift of (6n±2)-th order electromagnetic-force distortion is the same as the phase-shift of fundamental wave of the electromagnetic force in the respective phases. Therefore, (6n±2)-th order electromagnetic-force distortion has a distribution of the suction mode and the repulsive mode in a region corresponding to the one mechanical angle, which is the same as that of the electromagnetic-force distortion due to the fundamental wave thereof. As a result, the distribution of the suction mode and the repulsive mode is determined based on the structure of the motor 10. In other words, unique degree of the circular mode is determined corresponding to the structure of the motor 10.

Figures 4, 5:
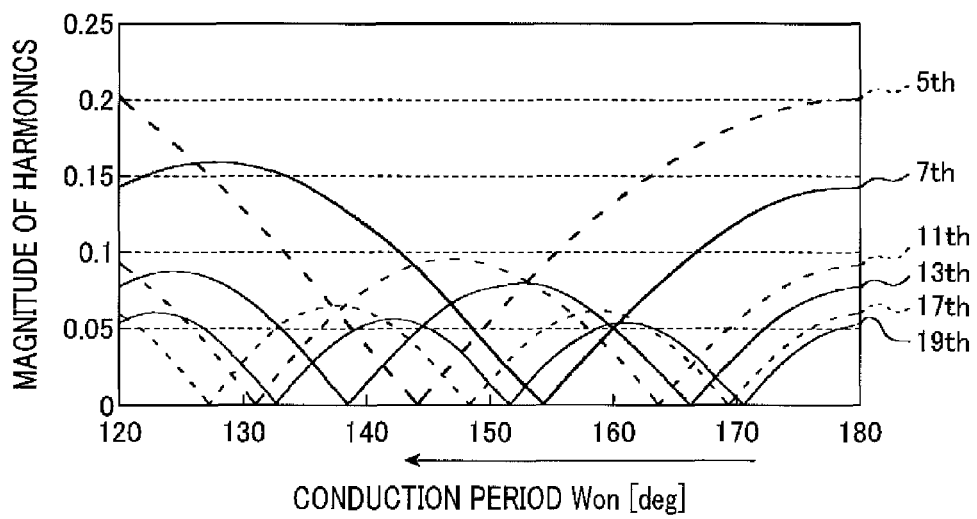
FIG. 4 is a diagram showing a relationship between the structure of the motor and the degree of the circular mode.
FIG. 5 is an explanatory diagram showing a principle of the first embodiment.

FIG. 4 is a diagram showing a relationship between the structure of the motor (i.e., the number of slots and the poles) and the degree of the circular mode, when the motor is configured by using the concentrated windings. For example, when four poles and six slots are used, comparing with a configuration using two poles and three slots, since a period in which the distribution of the suction mode and the repulsive mode varies in one mechanical angle corresponding to one rotation becomes ½, the degree of the circular mode is two.

As shown in FIG. 4, the motor 10 according to the first embodiment have a configuration using 10 poles and 12 slots, the resonance phenomenon corresponding to the second order degree circular mode occurs.

As described above, respective degree of the circular mode have own frequencies. Specifically, regarding the motor 10 according to the first embodiment, the inventors have found that the frequency of the 0-th degree circular mode is extremely high so that a resonance phenomenon is less likely to influence the motor 10. Accordingly, in the first embodiment, it is assumed that the resonant frequency represented by the above-described equation (c5) only corresponds to the second degree of the circular mode.

Hereinafter is described a method for setting the conduction period Won by using the conduction period setting unit 24 of the first embodiment. According to the first embodiment, the conduction period Won is set such that magnitude V1 of fundamental wave voltage is set to be a predetermined value V1b (fixed value) and, regarding a condition of an order of harmonics (2m=6n±2), an amount of (2m±1)-th order harmonics voltage, i.e., V (2m±1)-th is set to be zero while the above-described equation (c5) is substantially satisfied. The condition in which magnitude V1 of fundamental wave voltage becomes the predetermined value V1b is represented as the following equation (c6).

$$V1b = \sqrt{a1^2 + b1^2} \qquad (c6)$$
$$= \frac{1+\text{Duty}}{\pi} \cdot \sqrt{2 - 2 \cdot \cos(\text{Won})}$$

Therefore, the final duty value is represented as the following equation (c7).

$$\text{Duty} = \frac{V1b \cdot \pi}{\sqrt{2 - 2 \cdot \cos(\text{Won})}} - 1 \qquad (c7)$$

When the higher harmonics voltage Vk is expressed by using the equation (c7), the following equation (c8) is satisfied.

$$Vk = \frac{1}{\pi \cdot k} \cdot \left\{ 1 - \left( \frac{V1b \cdot \pi}{\sqrt{2 - 2 \cdot \cos(\text{Won})}} - 1 \right) \cdot \cos(k \cdot \pi) \right\} \cdot \qquad (c8)$$
$$\sqrt{2 - 2 \cdot \cos(k \cdot \text{Won})}$$

In the equation (c8), the order of harmonics in the voltage distortion when the condition (2m=6n±2) is satisfied includes 5th, 6th, 11th, 13th, 17th and 19th. The relationship between the conduction period Won and magnitude of harmonics Vk based on the above-described equation (c8) is as shown in FIG. 5.

As shown in FIG. 5, controlling the conduction period Won to be decreased as indicated by the arrow line, a conduction period Won capable of changing magnitude of 19th order harmonics V19 to be zero can be moved to a conduction period Won capable of changing magnitude of 5th harmonics to be zero. Hence, according to the first embodiment, as shown in FIG. 6, the conduction period Won is changed continuously in response to the rotational speed. Specifically, the higher the speed command value ω*, the lower the conduction period Won. This control is performed considering that the order of higher harmonics voltage satisfying the above-described equation (c5) is decreased when the rotational speed ω is increased.

Moreover, according to the first embodiment, as shown in FIG. 6, the conduction period Won is controlled to be decreased when the speed command value ω* becomes higher. Considering the above-described equation (c7), this control is to maintain magnitude V1 of the fundamental wave voltage to be constant regardless of the conduction period Won.

With reference to FIG. 7, the advantages of the first embodiment are described. As shown in FIG. 7, according to the first embodiment, 70th order (=6·12−2) of harmonic in the mechanical angle frequency is reduced by 11.5 dB and 80th order (=6·13+2) harmonics in the mechanical angle frequency is reduced by 6.8 dB.

Thus, according to the first embodiment, only the conduction period Won is used for a manipulative variable to reduce electromagnetic-force distortion while the above-described equation (c5) is substantially satisfied whereby the electromagnetic-force distortion can be reduced effectively and easily.

Second Embodiment

With reference to the drawings, the second embodiment is described as follows. It is noted that those part of the configuration different from that of the first embodiment are mainly described.

FIG. 8 is a graph showing a method for setting the conduction period Won according to the second embodiment. As shown in FIG. 8, according to the second embodiment, the conduction period Won is controlled to be increased or decreased while the speed command value ω* is increasing in an available rotational speed range of the motor 10. In other words, there are a region (i.e., increasing region) in which the conduction period Won is increased while the speed command value ω* is increasing and a region (i.e., decreasing region) in which the conduction period Won is decreased while the speed command value ω* is increasing. Accordingly, variable range of the conduction period Won can be lowered compared to the one of the above-described embodiment. Further, when magnitude V1 of the fundamental wave voltage is controlled to be a required value determined by the controlled valuable, fluctuation of the final duty value can be reduced.

Other Embodiment

The above-described embodiments can be modified with various way as follows.

Regarding the conduction period setting unit 24 (i.e., conduction period setting means), according to the above-described embodiments, the 6m order of electromagnetic distortion is not reduced. However, the control apparatus can be configured to reduce the 6m order of electromagnetic distortion.

According to the above-described embodiments, odd-order harmonics in the electromagnetic distortion are not reduced, however, it is not limited to this configuration. In other words, considering the above equation (c4), it is considered that even number of order harmonics less influences the electromagnetic distortion, when the final duty value is close to 1. Therefore, when the final duty value is set to be much smaller than 1, odd-order harmonics in the electromagnetic distortion can be reduced.

According to the above-described embodiments, the conduction period Won is controlled so as to set magnitude of the electromagnetic distortion to be zero. However, it is not limited to this configuration. As shown in FIG. 5, by using a conduction period Won which is slightly shifted from a conduction period Won corresponding to magnitude of the electromagnetic distortion being zero, the electromagnetic distortion can be effectively reduced.

Regarding the time ratio value setting unit 26, according to the above-described embodiments, the duty base value Db is set so as to fix the magnitude V1 of the fundamental wave voltage to be a predetermined value V1b. However, it is not limited to this configuration. For example, the final duty value may be set such that the larger the rotational speed ω (speed command value ω*), the larger the magnitude V1 of the fundamental wave voltage.

Regarding the feedback control unit 32 (i.e., feedback control means), according to the above-described embodiments, a sum of the proportional element and the integrating element in the output value is used as the feedback manipulative variable. However, it is not limited to this configuration. For example, a sum of the proportional element, the integrating element and the differential element can be used as the feedback manipulative variable.

According to the above-described embodiment, the feedback manipulative variable ΔD is used for a calibration value of the duty base value Db as a feed forward manipulative variable. However, it is not limited to this configuration. For example, the feedback manipulative variable can be used for the final duty value.

The feedback manipulative variable is not limited to the duty value, however, the phase δ may be used for the manipulative variable. Moreover, both the duty value and the phase δ can be used for the feedback manipulative variable.

Regarding the duty control, in the connection enabled period, the duty value is kept constant. However, it is not limited to this configuration. For example, the duty value may be smaller than 1 in the starting of the period and the ending of the period, and the duty value may be 1 in the intermediate period between the starting period and the ending period.

Further, it is not limited to controlling the lower arm switching elements S$n to be ON and OFF in the connection enabled period. For example, the upper arm switching elements S$p may be used to be controlled ON and OFF.

Furthermore, both upper switching elements S$p and lower switching elements S$n can be controlled to be ON and OFF. Assuming the duty values of the upper arm switching elements and the lower arm switching elements are the same, the k-th order harmonics is represented based on similar calculation in the above-described embodiments $$\sqrt{ak^2 + bk^2} = 2 \cdot \frac{\text{Duty}}{\pi \cdot k} \cdot \sin\left(\frac{k \cdot \pi}{2}\right) \cdot \sqrt{2 - 2 \cdot \cos\{k \cdot (P2 - P1) \cdot \pi\}} \quad (c9)$$

According to the above equation (c9), magnitude of the k-th order harmonics can be controlled to be zero, based on the controlling in the above-described embodiments.

Regarding the controlled variable, it is not limited to the rotational speed, however, a torque of the motor may be employed. In this case, the phase δ and the duty base value Db are set in response to a torque command value T* as shown in FIG. 1. The conduction period Won can be variably set in response to only the rotational speed w (detected value) or can be variably set in response to the rotational speed and the torque.

Regarding the rotary electric machine, the number of poles, slots of the rotary electric machine can be changed, and it is not limited to the concentrated windings. Further, it is not limited to the rotary electric machine adapted to a motor mounted on the blower fan.

What is claimed is:

1. A control apparatus that controls a rotary electric machine, comprising:
    operating means for operating a DC-AC conversion circuit including a switching element so as to control a controlled variable of the rotary electric machine, the switching element selectively connecting a positive terminal and a negative terminal of a DC power source to respective terminals of the rotary electric machine; and
    conduction period setting means included in the operating means for setting, in response to a rotational speed of the rotary electric machine, a conduction period during which the respective terminals of the rotary electric machine and the positive terminal and the negative terminal of the DC power source are electrically connected via the switching element,
    wherein:
        the rotary electric machine has a resonant frequency that is a first or higher degree of a circular mode of periodical elastic changes in shape of the rotary electric machine, and
        the conduction period setting means is configured to control a resonant frequency component of electromagnetic-force distortion in a radial direction of the rotary electric machine to be zero by performing a feed forward control using only the conduction period.

2. The control apparatus according to claim 1, wherein an order of the degree of the circular mode is equal to a number of periods of suction force and repulsive force produced within one rotation of the rotary electric machine.

3. The control apparatus according to claim 1, wherein the conduction period setting means is configured to control the conduction period such that the higher the rotational speed of the rotary electric machine, the lower the conduction period.

4. The control apparatus according to claim 1, wherein the conduction period setting means is configured to set the conduction period to be changed with respect to the rotational speed in an available rotational speed range, to have an increasing region in which the conduction period is increased while the rotational speed is increasing and a deceasing region in which the conduction period is decreased while the rotational speed is increasing.

5. The control apparatus according to claim 1, wherein the conduction period setting means is configured to change the conduction period continuously in response to the rotational speed.

6. The control apparatus according to claim 1, wherein operating means includes a feedback control means that controls either a duty value of the switching element in the conduction period set by the conduction period setting means or a phase of the conduction period so as to control the controlled variable including a torque or a rotational speed of the rotary electric machine.

* * * * *